US 8,645,377 B2

(12) United States Patent
Ness et al.

(10) Patent No.: US 8,645,377 B2
(45) Date of Patent: Feb. 4, 2014

(54) AGGREGATING DATA FROM A WORK QUEUE

(75) Inventors: Andrew Ness, Snohomish, WA (US); Alexander Mallet, Seattle, WA (US); Bruce Copeland, Redmond, WA (US); Christopher Rickman, Redmond, WA (US); Rajesh Viswanathan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 200 days.

(21) Appl. No.: 12/688,040

(22) Filed: Jan. 15, 2010

(65) Prior Publication Data

US 2011/0179028 A1 Jul. 21, 2011

(51) Int. Cl.
 *G06F 17/30* (2006.01)
(52) U.S. Cl.
 USPC .......................................... 707/737; 707/726
(58) Field of Classification Search
 USPC ............... 707/101, 6, 102, 10, 2, 5, 768, 752, 707/706, 726; 709/224
 See application file for complete search history.

(56) References Cited

U.S. PATENT DOCUMENTS

| 6,098,149 | A | | 8/2000 | Ofer et al. | |
|---|---|---|---|---|---|
| 6,115,705 | A | * | 9/2000 | Larson | 1/1 |
| 6,732,096 | B1 | * | 5/2004 | Au | 1/1 |
| 6,839,680 | B1 | * | 1/2005 | Liu et al. | 705/7.33 |
| 7,149,736 | B2 | * | 12/2006 | Chkodrov et al. | 1/1 |
| 7,280,752 | B2 | * | 10/2007 | Karuppiah | 396/238 |
| 7,469,241 | B2 | * | 12/2008 | Bellamkonda et al. | 1/1 |
| 7,483,898 | B2 | | 1/2009 | Abdo et al. | |
| 7,523,123 | B2 | * | 4/2009 | Yang et al. | 1/1 |
| 7,529,752 | B2 | * | 5/2009 | Hinshaw et al. | 1/1 |
| 7,620,653 | B1 | | 11/2009 | Swartz | |
| 7,673,327 | B1 | * | 3/2010 | Polis et al. | 726/5 |
| 7,734,947 | B1 | * | 6/2010 | Frangioso et al. | 714/4.1 |
| 7,779,008 | B2 | * | 8/2010 | Dageville et al. | 707/737 |
| 7,908,358 | B1 | * | 3/2011 | Prasad et al. | 709/224 |
| 7,936,913 | B2 | * | 5/2011 | Nordell et al. | 382/134 |
| 7,966,305 | B2 | * | 6/2011 | Olsen | 707/706 |
| 7,996,870 | B2 | * | 8/2011 | Suzuki | 725/87 |
| 8,032,481 | B2 | * | 10/2011 | Pinckney et al. | 706/62 |
| 8,082,235 | B1 | * | 12/2011 | Dasilva et al. | 707/691 |

(Continued)

FOREIGN PATENT DOCUMENTS

WO 2007044964 5/2009

OTHER PUBLICATIONS

1. Amazon Simple Queue Service (Amazon SQS)—Published Date: Dec. 31, 2007 http://aws.amazon.com/sqs/.

*Primary Examiner* — James Trujillo
*Assistant Examiner* — Thong Vu
(74) *Attorney, Agent, or Firm* — Sung Kim; Andrew Sanders; Micky Minhas

(57) ABSTRACT

One or more techniques and/or systems are disclosed herein for aggregating web-based data stored in a distributed data store so that it can be retrieved in a first-in, first-out (FIFO) manner. A unique aggregation key is generated for respective one or more data generated from a web-based event, where the one or more data are added to the distributed data store, and the aggregation key corresponds merely to the data generated from the web-based event. The one or more data from the web based event is aggregated in a FIFO queue and stored in a same partition of the distributed data store, based on the aggregation key.

20 Claims, 7 Drawing Sheets

(56) References Cited

U.S. PATENT DOCUMENTS

| | | | |
|---|---|---|---|
| 8,296,323 B2* | 10/2012 | Pollard | 707/784 |
| 8,327,187 B1* | 12/2012 | Metcalf | 714/10 |
| 2003/0182310 A1* | 9/2003 | Charnock et al. | 707/104.1 |
| 2004/0003038 A1* | 1/2004 | Huang et al. | 709/204 |
| 2005/0234920 A1* | 10/2005 | Rhodes | 707/10 |
| 2005/0267892 A1* | 12/2005 | Patrick et al. | 707/10 |
| 2005/0289138 A1* | 12/2005 | Cheng et al. | 707/5 |
| 2006/0122998 A1* | 6/2006 | Bar-Yossef et al. | 707/5 |
| 2007/0027896 A1* | 2/2007 | Newport et al. | 707/102 |
| 2007/0061393 A1* | 3/2007 | Moore | 709/201 |
| 2008/0005086 A1* | 1/2008 | Moore | 707/3 |
| 2008/0028467 A1* | 1/2008 | Kommareddy et al. | 726/23 |
| 2008/0033943 A1* | 2/2008 | Richards et al. | 707/6 |
| 2008/0133937 A1* | 6/2008 | Kato et al. | 713/193 |
| 2009/0006309 A1* | 1/2009 | Hunt et al. | 707/1 |
| 2009/0043789 A1* | 2/2009 | Gupta | 707/100 |
| 2009/0094073 A1* | 4/2009 | Cheung et al. | 705/7 |
| 2009/0138523 A1 | 5/2009 | Pi et al. | |
| 2009/0164496 A1 | 6/2009 | Carnathan et al. | |
| 2009/0210408 A1* | 8/2009 | Boyer et al. | 707/5 |
| 2009/0228434 A1* | 9/2009 | Krishnamurthy et al. | 707/2 |
| 2009/0234799 A1* | 9/2009 | Betawadkar-Norwood et al. | 707/2 |
| 2009/0299680 A1 | 12/2009 | Gibbs | |
| 2009/0319545 A1* | 12/2009 | Takagi et al. | 707/100 |
| 2009/0327714 A1* | 12/2009 | Yaghmour | 713/168 |
| 2010/0223261 A1* | 9/2010 | Sarkar | 707/726 |
| 2010/0235329 A1* | 9/2010 | Koren et al. | 707/687 |
| 2010/0241848 A1* | 9/2010 | Smith et al. | 713/153 |
| 2010/0250497 A1* | 9/2010 | Redlich et al. | 707/661 |
| 2011/0213766 A1* | 9/2011 | Hong et al. | 707/718 |

* cited by examiner

AGGREGATING DATA FROM A WORK QUEUE

BACKGROUND

The Internet comprises a plurality of websites/webpages that provide highly interactive and immersive applications, along with transactional-based applications, to users. Social networking, online games, online environments, and conferencing/chatting, for example, allow users to interact with each other and virtual environments. Further, transaction based applications, such as online product/service purchasing, account set-up, and financial service, typically require that users enter information to the web-application (web-app).

These web-based interactions/transactions typically generate data that is stored off (e.g., off the web) so that it can be later processed or accessed by another or the same application. For example, where a user updates their personal status message (e.g., in a social network or micro-blogging site), the data generated by entering the update can be stored off in a data store and later retrieved by a feed distribution service. Here, the feed distribution service may distribute the PSM update to subscribed contacts of the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Data generated by a web-event, which is to be stored off to a data store, is typically sent to a web-based asynchronous queue service (e.g., where data is put in then taken out asynchronously). The asynchronous queue service then stores the data off in a data store. Data from a web-event is typically generated in sequence, such as updates to a feed, and is subsequently processed or retrieved in the order in which it is generated. This type of storage and retrieval is commonly referred to as first-in-first-out (FIFO), such that data is aggregated, stored, and retrieved in a FIFO manner.

Web-apps that generate data to be aggregated and stored off can generate large amounts of data, and a plurality of web-apps, such as found on the Internet, exponentially increase the amount of data that may need to be stored. If a large amount of data is aggregated in a FIFO queue, it becomes very difficult to store it on one storage device (e.g., server). Therefore, asynchronous queue services typically employ distributed data stores to store the aggregated data, where the data is stored and organized over a plurality of storage devices. However, when aggregated data is distributed over a distributed data store it gives up the FIFO aggregation structure. Therefore, when data is retrieved or processed from a distributed data store it may not be retrieved in a FIFO manner, which can lead to improper and/or slow processing of the data.

One or more techniques and/or systems are disclosed that provide for aggregation of data from a web-event, regardless of an amount of data generated, where the data can be stored in a FIFO queue on a distributed data store. For example, a web-event can generate data and the data can be tagged with an aggregation queue. In this example, the data can be aggregated into a FIFO queue using the aggregation key, and the FIFO queue can be stored off in a distributed data store.

In one embodiment, web-based data, such as generated by a web-event, is aggregated and stored in a distributed data store, so that it can be retrieved in a first-in, first-out (FIFO) manner. A unique aggregation key is generated for data generated from a web-based event, if the data is to be added to the distributed data store, where the aggregation key corresponding merely to the data generated from the web-based event. The data from the web based event is aggregated in a FIFO queue and stored in a same partition of the distributed data store, based upon the aggregation key.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
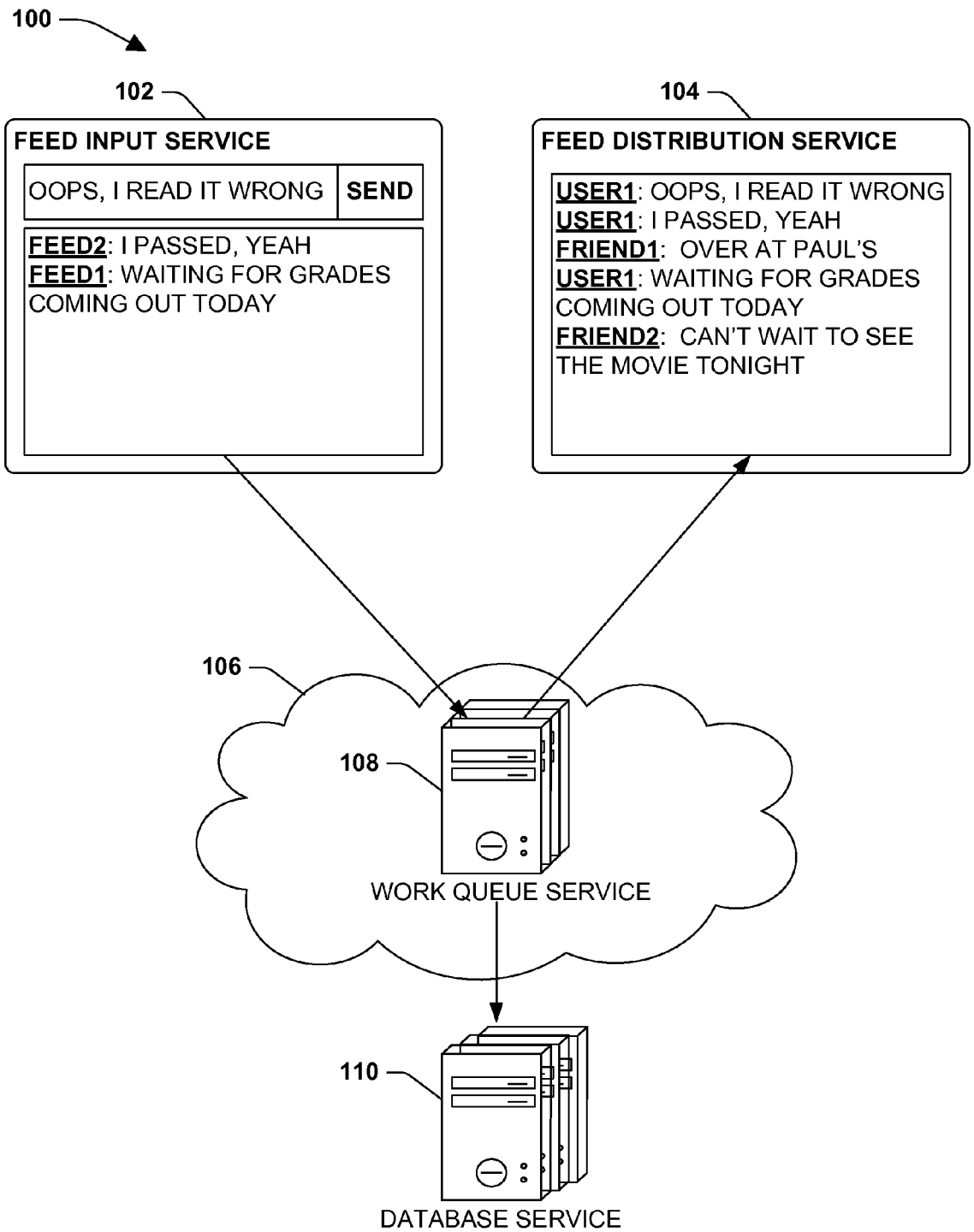
FIG. 1 illustrates an exemplary environment where one or more of the techniques and/or systems, described herein, may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 illustrates an exemplary environment 100 where one or more of the techniques and/or systems, described herein, may be implemented. Commonly, web services, such as one that provides for a personal status message (PSM) for users of the service, store data off in an external storage location for later processing. In this exemplary environment 100, a user that wishes to update their PSM may utilize a feed input service 102.

Typically, the user types a message into the feed input service 102, such as FEED1 listing the user's status as "waiting for grades coming out today." The feed is forwarded to a web-based 106 asynchronous queue service 108, which may be one of a plurality of queue services that asynchronously put data in and take data out of a work queue, where the data comprising the feed is tagged. The tagged data can then be stored off in a distributed data storage service 110 for processing.

As an example, a user may update their PSM rapidly (e.g., several times over a couple of minutes), as shown in the example environment 100. Here, the user's FEED2 stated that "I passed, yeah," however they may have quickly realized that they did not and immediately updated the feed to say "oops, I read it wrong." The feeds are sent to the work queue service 108 (e.g., an asynchronous queue service), over the web 106, and stored off in the database service 110. A feed distribution service 104, such as a friend status updater, can detect that user1's status has changed and pickup the feeds from the work queue service 108.

The work queue service 108 retrieves the feeds from the database service 110, and forwards them to the feed distribution service 104, where they can be sent out and/or displayed to those subscribed to the feed distribution service 104 for user1. In this example, feeds are retrieved from by the distribution service 104 in the order in which they are sent out by the work queue service 108. As shown in the example, it is typically very important that the feeds be retrieved by the feed distribution service 104 in a same order in which they were input by the feed input service 102. For example, it would be a little confusing if user1's first output feed said "oops I read it wrong," and the second output feed said "I passed, yeah." This example has a completely different meaning than the original feed order, described above.

Figure 2:
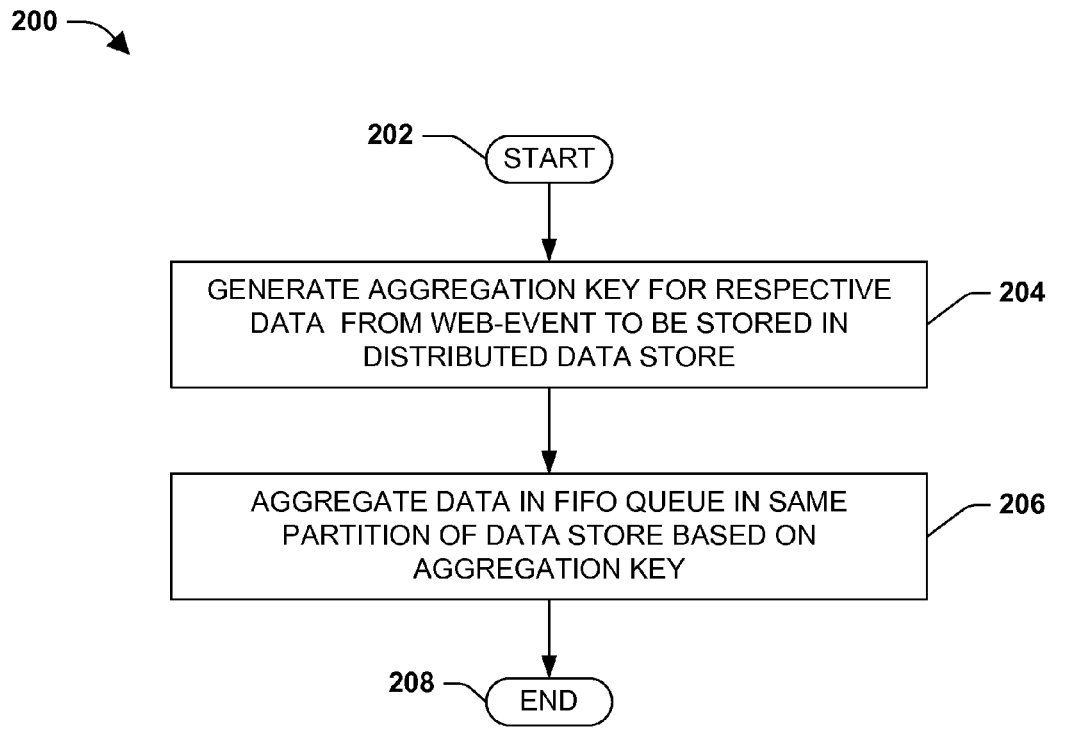
FIG. 2 is a flow diagram of an exemplary method for aggregating web-based data stored in a distributed data store so that it can be retrieved in a first-in, first-out (FIFO) manner.

FIG. 2 is a flow diagram of an exemplary method 200 for aggregating web-based data stored in a distributed data store so that it can be retrieved in a first-in, first-out (FIFO) manner. The exemplary method 200 begins at 202 and involves generating an aggregation key for data that is generated from a web-based event, such as a PSM feed, at 204. Here, the key is generated for data that is going to be added to the distributed data store, and the aggregation key corresponds merely to the data that is generated from the web-based event (e.g., the PSM feed).

That is, when a web-event generates some data, and the generated data is to be stored off in the distributed data store, an aggregation key is generated for that data to be stored from that event, which is specific to that data, for example. In one embodiment, the data can be stored off, along with a unique aggregation key for the web-event that identifies the data from that event. As an example, a web-event may comprise an online transaction, such as a product purchase. In this embodiment, for example, an aggregation key can be generated for the purchase information entered by the purchaser (e.g., account information, address, etc.), where the key is merely associated with that transaction.

At 206, in the exemplary method 200, data from the web based event is aggregated in a FIFO queue, in a same partition of the distributed data store, using the aggregation key. That is, the distributed data store, used to store off the web-event generated data, is partitioned into a plurality of data storage partitions. In one embodiment, partitions are virtual storage blocks, in as much as the partitions do not represent physical barriers, but merely virtually created combinations of available storage using a directory structure.

As an illustrative example, all of the data generated from a single web-based event, such as the online transaction, is stored in a same partition. It is aggregated together in the partition, in this example, if it has the same unique key for the transaction. Further, the data from the transaction is aggregated in a FIFO queue, where data that is put into the data store first is taken from the data store first, for example, when requested for retrieval. This can be of particular importance, for example, where an order of the data from the web-event is relevant, such as a PSM update, as described above. Further, for example, a FIFO queue typically represents an asynchronous queue, where data is put in and taken out at different times (e.g., asynchronously).

In one embodiment, a first partition of the distributed data store is designated as a storage location to store aggregated data associated with a first aggregation key; and a second partition of the distributed data store is designated as a storage location to store aggregated data associated with a second aggregation key. That is, in one embodiment, when a first web-event generates data, a first aggregation key is generated for that first data, and when a second web-event generates data, a second aggregation key is generated for that second data.

As an example, a first partition of the distributed data store is designated to store the first data, identified by the first aggregation key, and a second partition of the data store is designated to store the second data, identified by the second aggregation key. In these embodiments, this example is merely intended to illustrate how data associated with a particular aggregation key is stored in a same partition, and different aggregation keys can be assigned to different partitions. It will be appreciated that, in some embodiments, data associated with different aggregation keys can be stored in a same partition. However, data associated with a first aggregation key is stored merely in a first partition, and is not distributed over a plurality of partitions.

Having aggregated the data, the exemplary method 200, of FIG. 2, ends at 208.

Figure 3:
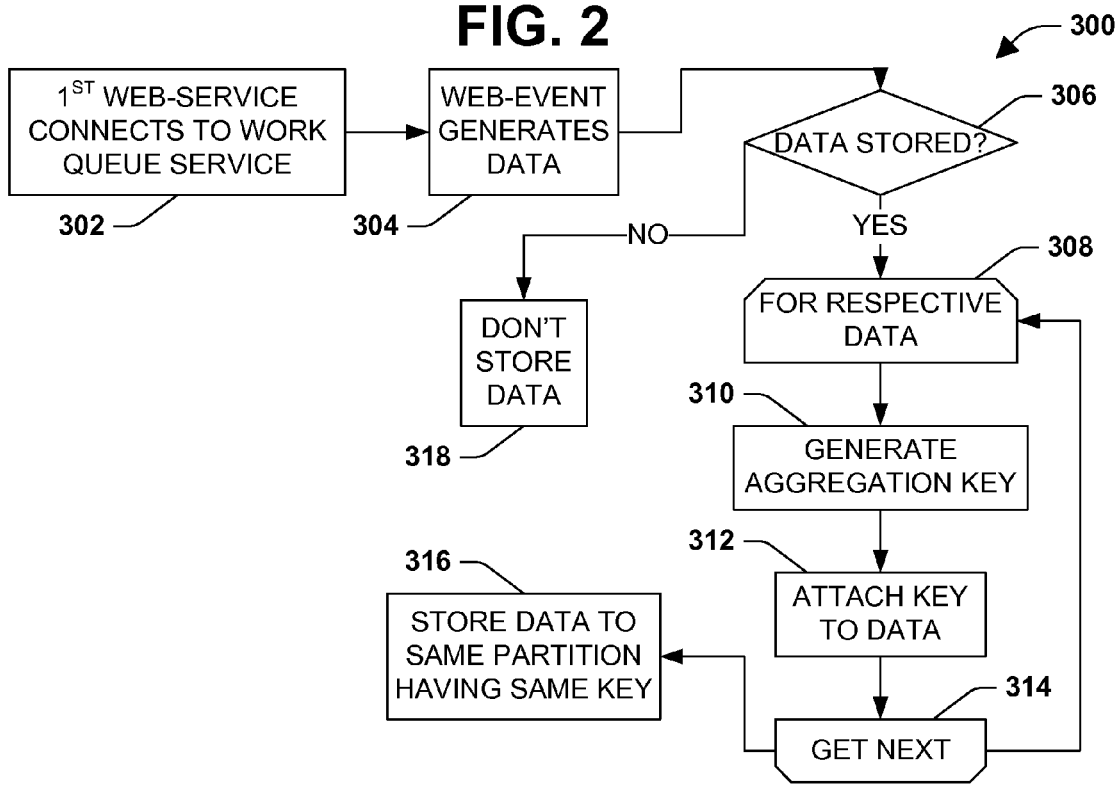
FIG. 3 is a flow diagram illustrating one embodiment of an implementation of one or more of the methods described herein.

FIG. 3 is a flow diagram illustrating one embodiment 300 of an implementation of one or more of the methods described herein. At 302, a web-service (e.g., the feed service 102 of FIG. 1) connects to a work queue service (e.g., 108 of FIG. 1). At 304, a web-event (e.g., a PSM update from a user) generates data. As an example, a web-service may be service that runs an application programming interface (API), or some web-application, accessed by a user from a website. The user interacts with the API or web-app, resulting in a web-event, inputting data or performing some action that generates data, such as in the PSM example described above.

At 306, if the data generated by the web event is not to be stored, for example, where the web-service does not need to store the data for later processing, the data is not stored, at 318. On the other hand, in this embodiment, if the web-service wants the data to be stored off for later processing, a processing loop runs from 308 to 314. For each of the data generated by the web-event, such as for each part of a transaction, an aggregation key is generated (e.g., a key unique to the web-event), at 310.

The aggregation key is not limited to any particular format, merely that is can be used to specifically identify the data associated with a particular web-event. In some embodiments, the aggregation key may comprise: a randomly generated string, such as a string of alpha-numeric symbols; or a hash (hash value) generated by hashing the data (e.g., running the data through a hash function); or a sequentially generated string (e.g., a next sequential value is assigned as a key for a next set of data).

At 312, the aggregation key is attached to the data. It will be appreciated that attaching the aggregation key to the data is not limited to a particular embodiment. The attachment of the aggregation key to the data is intended to allow the data to be identified by the key. For example, the key can be attached as metadata to the data by adding the metadata sequence to the data sequence, such as a prefix or suffix. As another example, the key may be linked in data table, where if one looks up the key in the table the data linked to the key can be identified.

At 314, another data item generated from the web-event can be run through the loop beginning at 308. After respective data generated by the web-event have the aggregation key attached, the data can be stored to a partition in the distributed data store, at 316. Here, the data that has the same aggregation key is stored to the same partition. As an example, all the data generated by the web-event is given the same aggregation key, and, using that aggregation key, all the data from that web-event is aggregated together in the same partition, and not split-up between different partitions. In one embodiment, an operation can be performed on the distributed data store, for example, by the web queue service, where an add operation is used to store data to the partition of the distributed operation in the FIFO queue.

Further, in this embodiment, the aggregated data is stored in the partition of the distributed data store in a first-in-first-out (FIFIO) queue. That is, for example, data that is generated first by the web-event (e.g., a first PSM update) is stored first in the FIFO queue, and subsequent data generated by the web-event (e.g., subsequent PSM updates) are stored second, third, etc. in the FIFO queue. In this way, in this example, when data is later taken from the data store, the data that is first in the FIFO queue is taken first, such that the first in data is the first out data.

Figure 4:
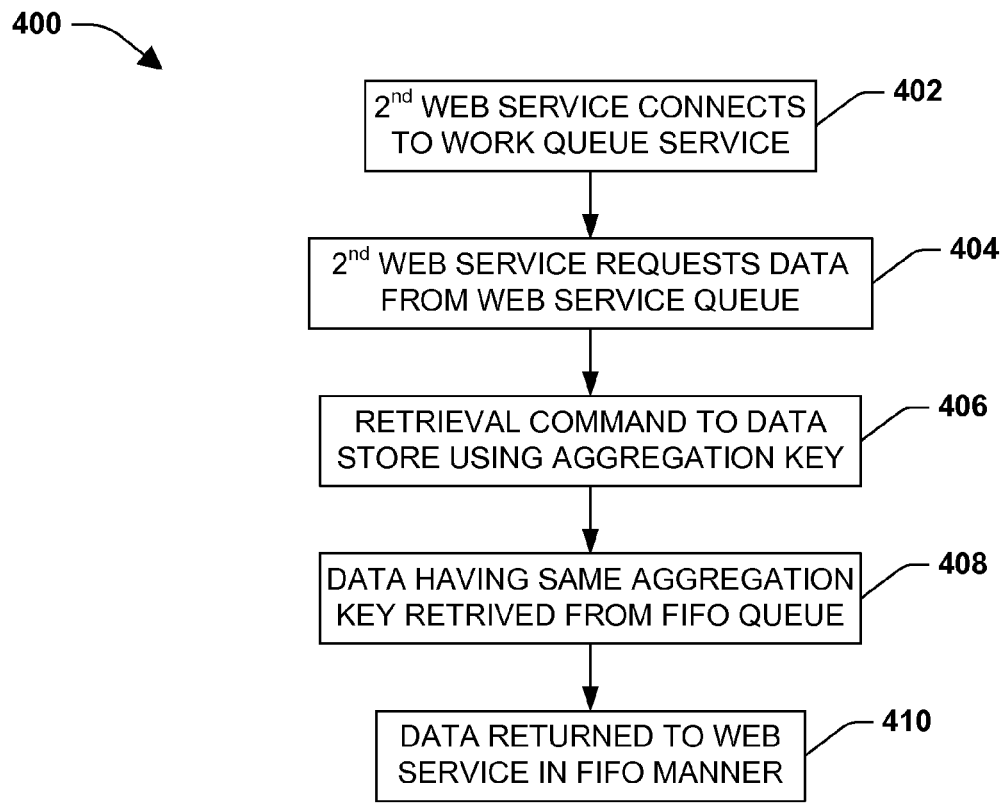
FIG. 4 is a flow diagram illustrating an exemplary portion of a method whereby aggregated data can be retrieved from a data store in a FIFO manner.

FIG. 4 is a flow diagram illustrating an exemplary portion of a method 400 whereby aggregated data can be retrieved from the data store in a FIFO manner. As an example, with reference to FIG. 1, a first web-service (e.g., 102) may generate data, and have it aggregated and stored to distributed data store (e.g., 110); and a second web-service (e.g., 104) may retrieve the aggregated data from the distributed data store (e.g., 110) in a FIFO manner. It will be appreciated that the first and second web-services may be different services, and may they may connect to the work queue service remotely from separate remote operations; and in another embodiment they may be a same service.

At 402, the second web service connects to the work queue service (e.g., 108), such as by connecting over the Internet (e.g., 106). In one embodiment, the web queue service may comprise a service oriented application executed on one or more computers, which may be used to generated the aggregation key and aggregate the data, such as for storage in the distributed data store. In this embodiment, the service oriented application may be built from an API in a software development framework. As an example, a SOAP-based service application (originally an acronym for "Simple Object Access Protocol," however common art usage of SOAP no longer applies to the original acronym) can be created using a framework API (e.g., Windows Communication Foundation). In this example, the second web service can also contact the work queue service.

At 404, the second web service (e.g., 104) requests data from the web queue service (e.g., 108). As an example, the second web-service may be a feed distribution service (e.g., distributing a user's feed to the user's connection), which, when notified that a user's feed has been updated, requests the feed data from the web queue service. As a further example, a user may be listening to a new music album, recently purchased, and has settings that notify his subscribing contacts whenever the user is listening to music. The second web service, as a feed distribution service, contacts the web queue service and requests the data that identifies the music.

At 406 in the exemplary portion of the method 400, a data retrieval command can be sent to the data store using the aggregation key. For example, the web queue service (e.g., 108) can send a command that performs a take operation on the data store, intended to retrieve data from the FIFO queue of the partition in the distributed data store (e.g., 110).

Here, upon request, data that has a same aggregation key can be retrieved from the distributed data store in a FIFO manner, at 408. As described above, the data having the same aggregation key attached is aggregated together in one partition of the data store. Therefore, for example, all of the data associated with the web-event for which the aggregation key was generated can be retrieved at a same time, by using the command that identifies the aggregation key. Further, in this example, the data will be retrieved in a FIFO manner, as it is stored in a FIFO queue in the partition. In this way, in this example, the data that went in first will come out first.

At 410, the retrieved data is sent to the second web service in a FIFO manner. In this way, as an example, the second web service can broadcast to the subscribing contacts that "the user is listening to the new album." Further, other information associated with the web event can be distributed by the second web service, for example, in a manner consistent with when it was generated, which may avoid potentially confusing situations, as described in FIG. 1.

In one embodiment, the service oriented application (e.g., the web queue service 108 of FIG. 1) can be running on a first set of devices (e.g., computers, servers, etc.) and the distributed data store may be disposed on a second set of devices. That is, for example, a web queue service may be a separate operation, in a separate location, from the distributed data store. In this example, the separate and remote services can communicate with each other using the Internet (e.g., 106 of FIG. 1), or some other network service.

In another embodiment, the distributed data store may be web-based, such that the storage volumes and hierarchical directory structures merely utilize the Internet for connecting and retrieving data. In another embodiment, the data store and queue services may be operating together as a same service, and/or one a same device. It will be appreciated that those skilled in the art may devise alternate configurations for these services, and the methods and systems described herein are not limited to any particular embodiment.

Figure 5:
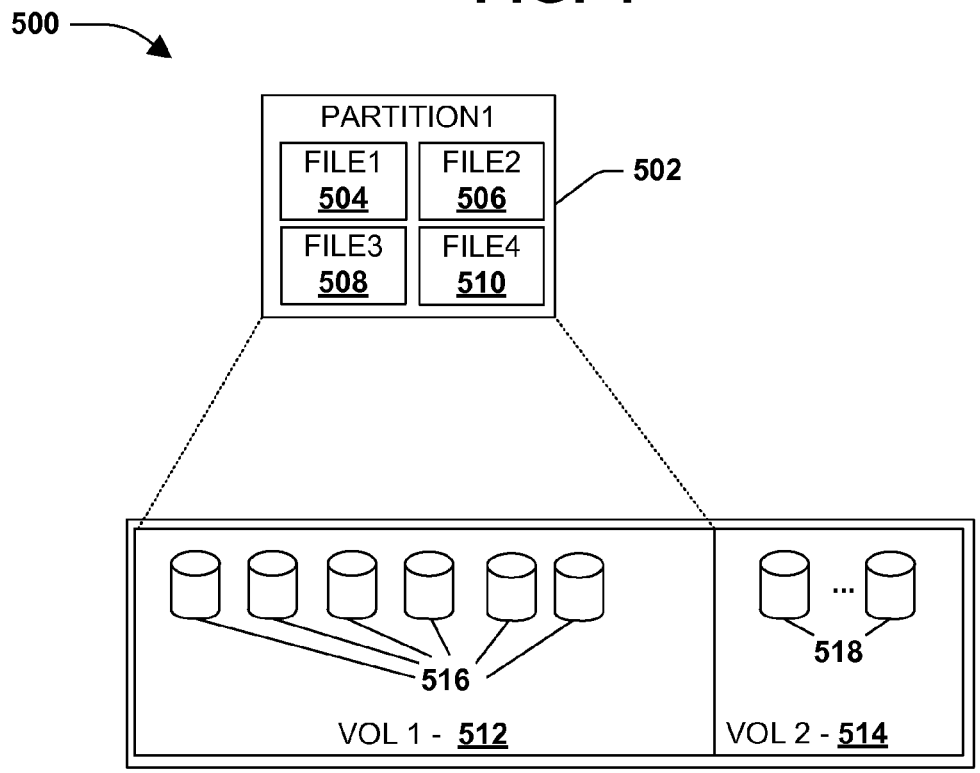
FIG. 5 is a component diagram illustrating an exemplary embodiment of how a distributed data store may be arranged.

Further, in one aspect, the distributed data store can be comprise of a plurality of data storage devices, where related data can be stored on different devices, even if it is in a same partition. FIG. 5 is a component diagram illustrating an exemplary embodiment 500 of how a distributed data store may be arranged. In this embodiment 500, the data store may comprise a plurality of volumes 512, 514, where the volumes are virtual volumes that are not limited by physical storage devices.

Respective volumes 512, 514 can be made up of one or more portions of physical storage devices 516, 518, such as physical storage disks disposed in one or more data storage devices. Volumes (e.g., 512, 514) can span a portion of a disk, a cluster of disks, or portions of different disks, for example, enabling a distributed data store to define an overall logical arrangement of file storage. Disks (e.g., 516, 518) may comprise any type of mass storage devices, such as magnetic disk drives, flash memory, and any other similar media adapted to store information.

In one embodiment a volume can comprise data stored as one or more files 504, 506, 508, 510 that reside in a hierarchical directory structure within the volume, such as a partition 502. Therefore, for example, while data from a same web-event, having a same aggregation key, can be aggregated in a FIFO queue (e.g., 504) on a partition (e.g., 502), because the partition may be disposed on a volume (e.g., 512) that is comprised on one or more storage devices (e.g., 516), the aggregated data may be store in different physical locations. However, in this embodiment, because the partition organizes the data hierarchically, the aggregated data can be quickly identified and retrieved in a FIFO manner using the aggregation key.

A system may be devised that provides for related data, such as generated by a web event, to be aggregated on a distributed data store. The system can provide for related data generated by a web-based event to be aggregated, and stored in a FIFO queue. In this way, the data can be retrieved from this distributed data store in a FIFO manner, even while the system comprises a highly distributed data storage protocol, which is also highly scalable.

Figure 6:
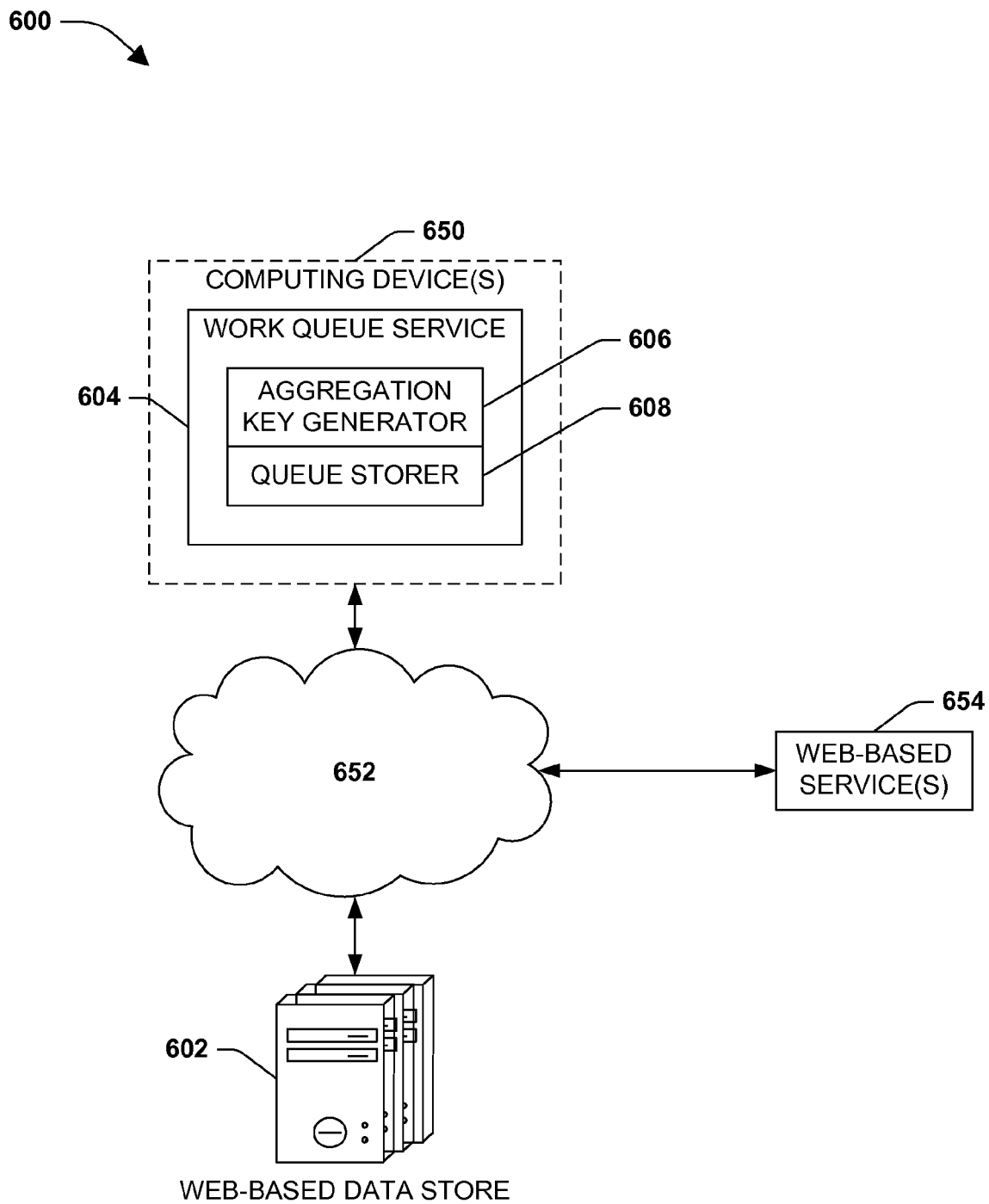
FIG. 6 is a component diagram of an exemplary system for aggregating web-based data stored in a distributed data store for retrieval in a first-in, first-out (FIFO) manner.

FIG. 6 is a component diagram of an exemplary system 600 for aggregating web-based data stored in a distributed data store for retrieval in a first-in, first-out (FIFO) manner. A web-based work queue service component 604 (e.g., an asynchronous queue service component) is operably coupled with a distributed data store 602, which is comprised of a plurality of data storage devices. The work queue service component 604 can store and retrieve web-based (e.g., generated from the Internet 652) data in a FIFO manner to/from the distributed data store 602.

The work queue service component 604 comprises an aggregation key generation component 605 that generates an aggregation key corresponding merely to data generated from a same web-based event, for data that is intended to be added to the distributed data store 602. For example, a user may interact with a web-based service 654 (e.g., an web-app running on a website, such as a feed input service) over the Internet 652, such that the interaction provides a web event that generates data to be stored in the data store for later processing, such as by another web-based service 654 (or the same one).

The work queue service component 604 further comprises a queue storing component 608 that aggregates the data generated by the web-event in a FIFO queue in a same partition of the distributed data store based on the aggregation key. That is, for example, the aggregation key generator 606 generates a unique key for the data generated by the web event, and the queue storing component 608 aggregates the web event data together using the aggregation key. In this example, the aggregated data is stored in a FIFO queue together in one partition of the distributed data store 602.

Figure 7:
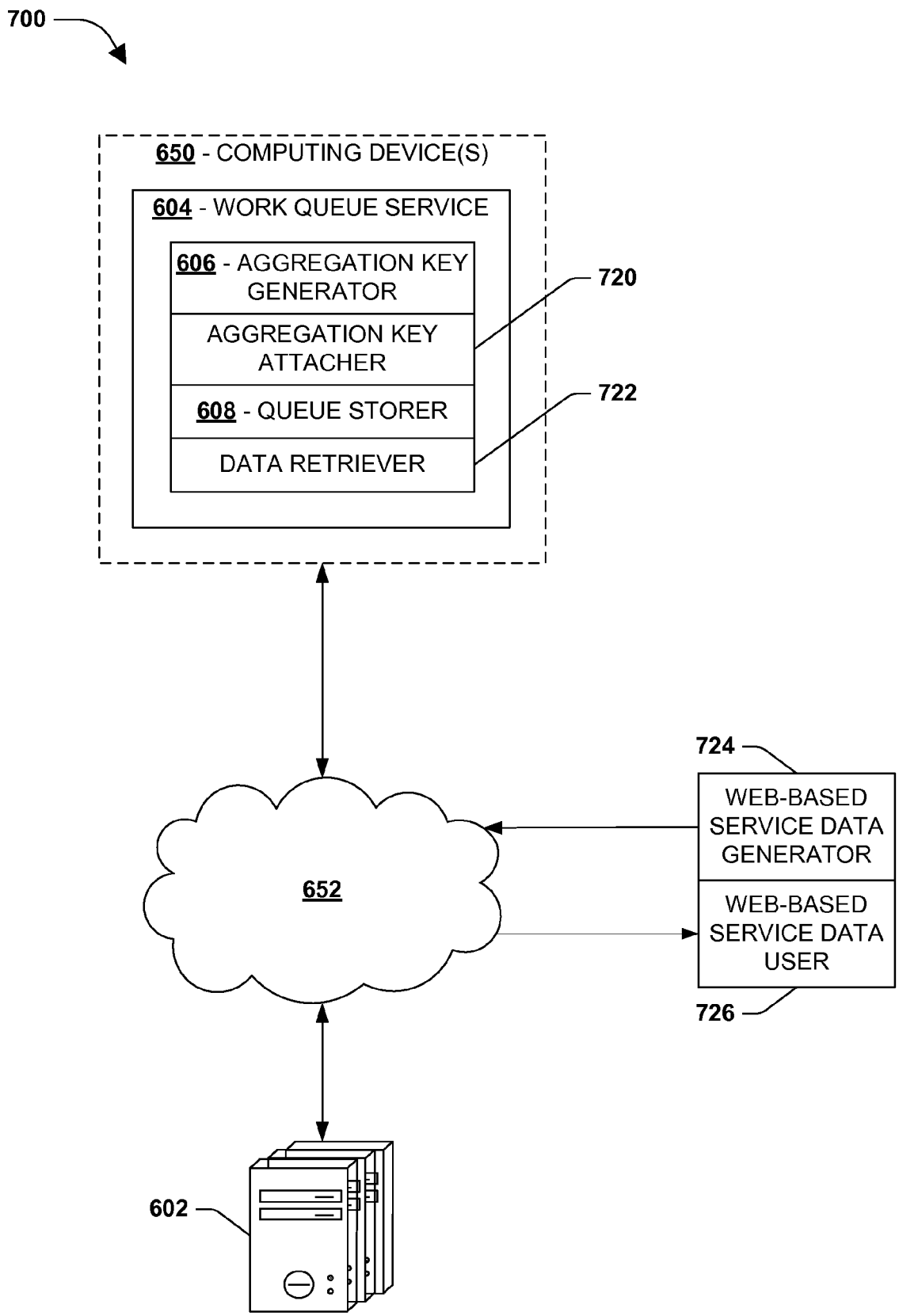
FIG. 7 is a component diagram of one embodiment of an implementation of one or more of the systems described herein.

FIG. 7 is a component diagram of one embodiment 700 of an implementation of one or more of the systems described herein. In this embodiment 700, the work queue service 604, which can be disposed in one or more computing devices 650, is remotely connected 652 (e.g., over the Internet or some network connection) to one or more services 724, 726 that run web-based events. In this embodiment, a web-based service 724 generates data for storage in a FIFO queue of a partition of the distributed data store 602. Further, a web-based service 726 uses stored data, by retrieving it from the FIFO queue in a FIFO manner.

In one aspect, the web-based work queue service 604 may comprise a service-oriented application that is running on the one or more computers 650 utilizing a web-based environment. Here, the service-oriented application, can be built from an application programming interface (API) in a software development framework, and use a SOAP interface to communicate with the one or more services 724, 726.

In this embodiment 700, the web-based work queue service component 604 comprises an aggregation key attachment component 720 that attaches the aggregation key to respective web-based data from a same web-based event. For example, when the work queue service 604 detects a web-event, such as undertaken by the web-based service data generator 724, and an aggregation key is generated for respective data by the aggregation key generator 606, the aggregation key attacher 720 can attach the key to the data.

The aggregation key attacher 720 is not limited to any particular embodiment in attaching the key. For example, the key may be appended before or after the data, such as a prefix or suffix; or the key may be linked to the data using a look up table (e.g., an XML lookup table). Further, the aggregation key is not limited to any particular embodiment. For example, the aggregation key may comprise a string generated for the web-based event that corresponds merely to the web-based event, such as a randomly generated alpha-numeric string, or a sequentially generated string. As another example, the aggregation key may comprise a hash (hash value) generated by hashing the data from the web-based event (e.g., running the data through a hash function).

In the exemplary embodiment 700, the web-based work queue service component 604 comprises a data retrieval component 722 that can provide data to a web-based service, such as the web-based service data user 726, upon request. The data retrieval component 722 can retrieve and provide the data in a FIFO manner from the partitioned queue on the distributed data store 602.

Figure 8:
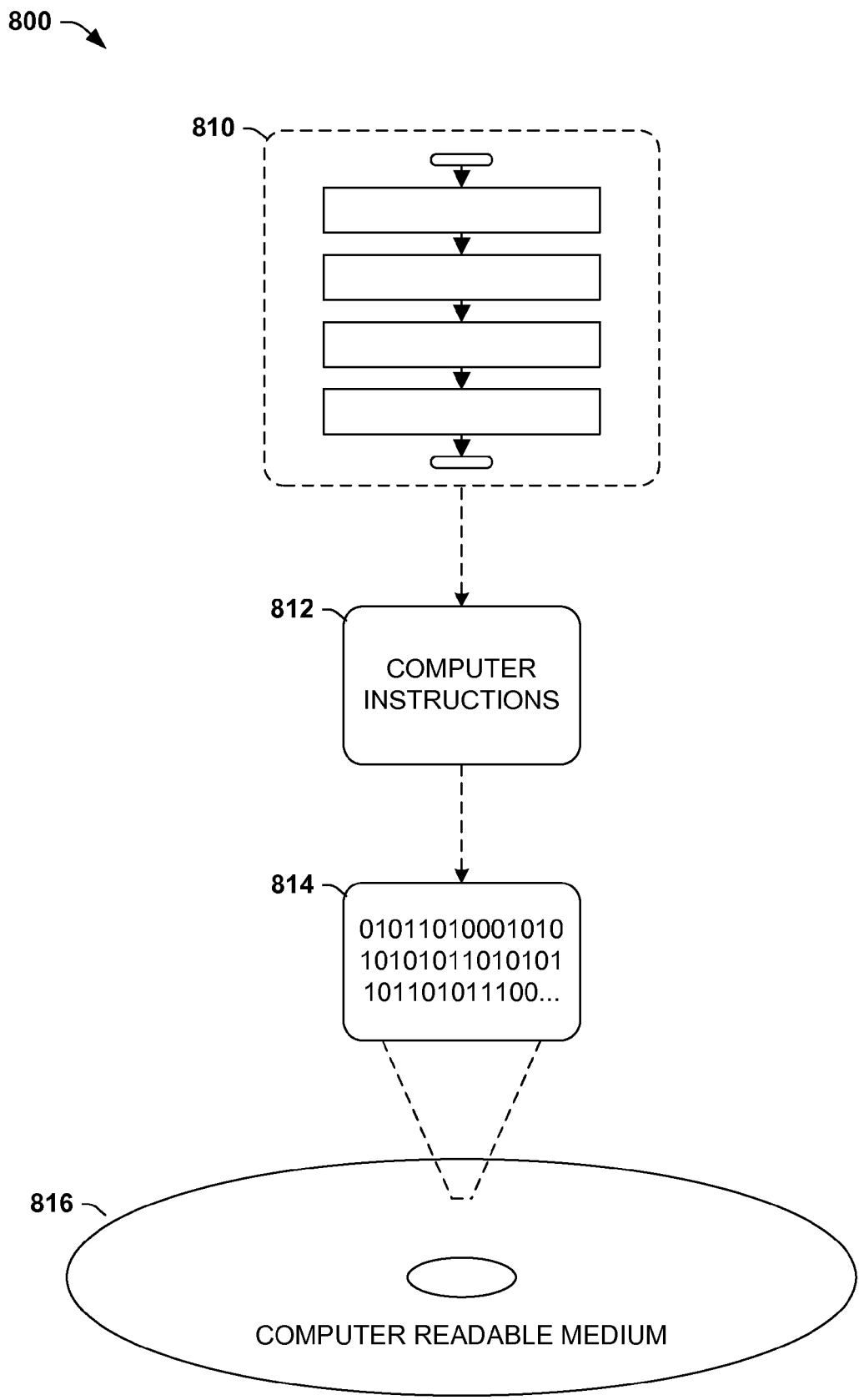
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., an encoded portable disk, such as a CD-R, DVD-R, non-volatile storage drive, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 200 of FIG. 2, for example. In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
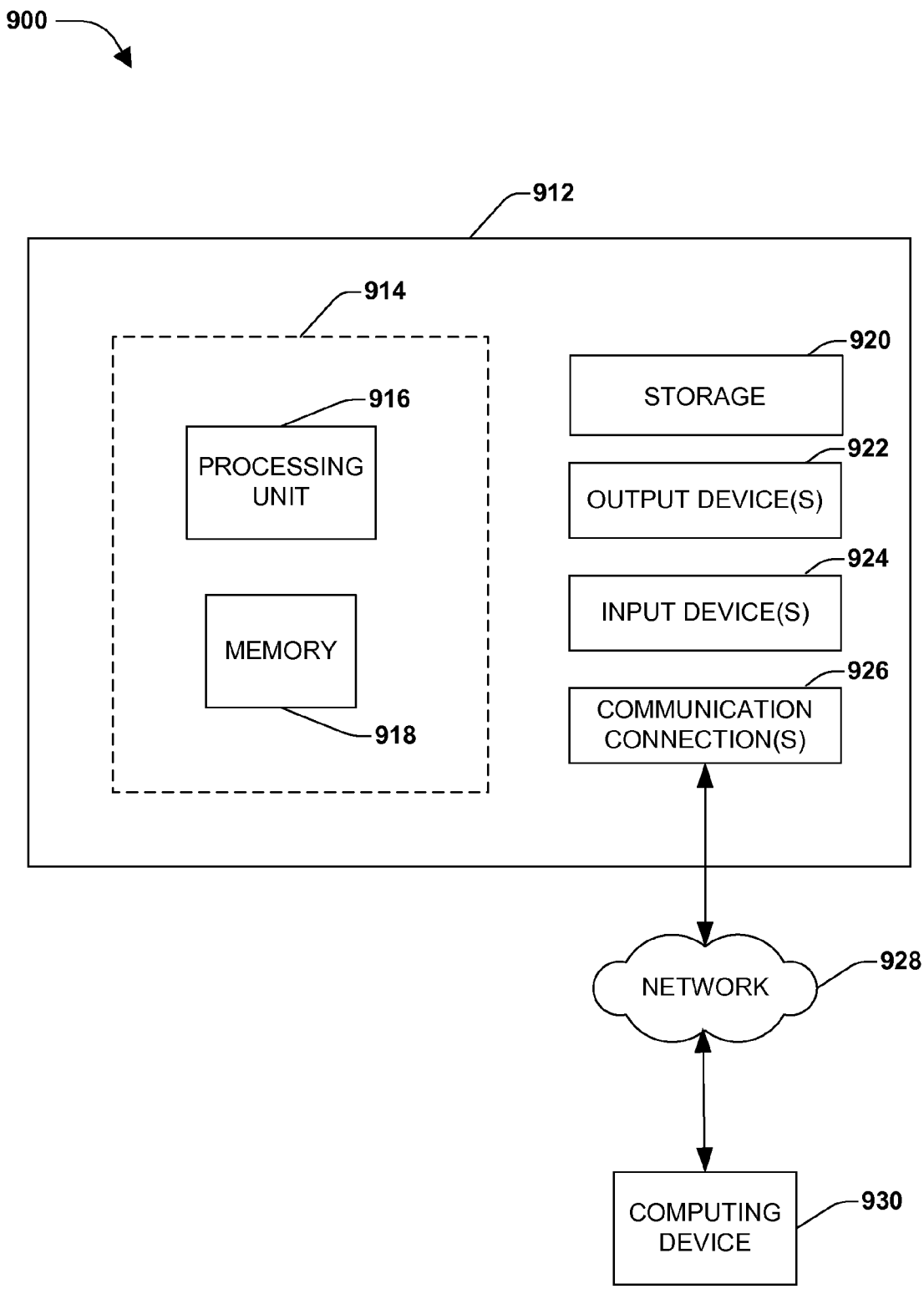
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   identifying a first message within a first message feed of a first user;
   computing a first aggregation key based upon the first message;
   appending the first aggregation key to the first message as at least one of a first prefix or a first suffix;
   selectively storing the first message within a first data partition, but not a second data partition, designated for storing message data associated with the first aggregation key;
   identifying a second message within the first message feed of the first user, the second message corresponding to a status update with respect to the first message;
   responsive to determining the second message corresponds to the status update with respect to the first message, appending the first aggregation key to the second message as at least one of a second prefix or a second suffix;
   selectively storing the second message within the first data partition, but not the second data partition;
   identifying a third message within a second message feed of a second user;
   computing a second aggregation key based upon the third message;
   appending the second aggregation key to the third message as at least one of a third prefix or a third suffix; and
   selectively storing the third message within the second data partition, but not the first data partition, designated for storing message data associated with the second aggregation key.

2. The method of claim 1, the first data partition corresponding to a first virtual storage structure stored across a first physical storage device and a second physical storage device.

3. The method of claim 2, the selectively storing the first message comprising storing the first message within the first physical storage device, and the selectively storing the second message comprising storing the second message within the second physical storage device.

4. The method of claim 1, comprising:
   maintaining a first-in, first-out (FIFO) queue within the first data partition for messages associated with the first aggregation key; and
   facilitating retrieval of at least one message from the first data partition in a FIFO manner utilizing the FIFO queue.

5. The method of claim 4, the facilitating retrieval of at least one message comprising:
   retrieving the first message before the second message.

6. The method of claim 2, comprising:
   maintaining a first-in, first-out (FIFO) queue within the first data partition, the FIFO queue stored within a third physical storage device across which the first virtual storage structure is stored.

7. The method of claim 2, the second data partition corresponding to a second virtual storage structure stored across a third physical storage device and a fourth physical storage device, the selectively storing the third message comprising storing the third message within the third physical storage device.

8. The method of claim 7, comprising:
   maintaining a second first-in, first-out (FIFO) queue within the fourth physical storage device for messages associated with the second aggregation key; and
   facilitating retrieval of at least one message from the second data partition in a FIFO manner utilizing the second FIFO queue.

9. A computer readable storage device comprising instructions that when executed perform a method comprising:
   identifying a first message within a first message feed of a first user;
   computing a first aggregation key based upon the first message;
   appending the first aggregation key to the first message as at least one of a first prefix or a first suffix;
   selectively storing the first message within a first data partition, but not a second data partition, designated for storing message data associated with the first aggregation key;
   identifying a second message within the first message feed of the first user, the second message corresponding to a status update with respect to the first message;
   responsive to determining the second message corresponds to the status update with respect to the first message, appending the first aggregation key to the second message as at least one of a second prefix or a second suffix;
   selectively storing the second message within the first data partition, but not the second data partition;
   identifying a third message within a second message feed of a second user;

computing a second aggregation key based upon the third message;

appending the second aggregation key to the third message as at least one of a third prefix or a third suffix; and selectively storing the third message within the second data partition, but not the first data partition, designated for storing message data associated with the second aggregation key.

10. The computer readable storage device of claim 9, the first data partition corresponding to a first virtual storage structure stored across a first physical storage device and a second physical storage device.

11. The computer readable storage device of claim 10, the selectively storing the first message comprising storing the first message within the first physical storage device, and the selectively storing the second message comprising storing the second message within the second physical storage device.

12. The computer readable storage device of claim 9, comprising:

maintaining a first-in, first-out (FIFO) queue within the first data partition for messages associated with the first aggregation key; and facilitating retrieval of at least one message from the first data partition in a FIFO manner utilizing the FIFO queue.

13. The computer readable storage device of claim 12, the facilitating retrieval of at least one message comprising:

retrieving the first message before the second message.

14. The computer readable storage device of claim 10, comprising:

maintaining a first-in, first-out (FIFO) queue within the first data partition, the FIFO queue stored within a third physical storage device across which the first virtual storage structure is stored.

15. The computer readable storage device of claim 10, the second data partition corresponding to a second virtual storage structure stored across a third physical storage device and a fourth physical storage device, the selectively storing the third message comprising storing the third message within the third physical storage device.

16. The computer readable storage device of claim 15, comprising:

maintaining a second first-in, first-out (FIFO) queue within the fourth physical storage device for messages associated with the second aggregation key; and facilitating retrieval of at least one message from the second data partition in a FIFO manner utilizing the second FIFO queue.

17. A system, comprising:

a storing component configured to:

identify a first message within a first message feed of a first user;

compute a first aggregation key based upon the first message;

append the first aggregation key to the first message as at least one of a first prefix or a first suffix;

selectively store the first message within a first data partition, but not a second data partition, designated for storing message data associated with the first aggregation key;

identify a second message within the first message feed of the first user, the second message corresponding to a status update with respect to the first message;

responsive to determining the second message corresponds to the status update with respect to the first message, append the first aggregation key to the second message as at least one of a second prefix or a second suffix;

selectively store the second message within the first data partition, but not the second data partition;

identify a third message within a second message feed of a second user;

compute a second aggregation key based upon the third message;

append the second aggregation key to the third message as at least one of a third prefix or a third suffix; and selectively store the third message within the second data partition, but not the first data partition, designated for storing message data associated with the second aggregation key.

18. The system of claim 17, comprising:

a data retrieval component configured to:

maintain a first-in, first-out (FIFO) queue within the first data partition for messages associated with the first aggregation key; and facilitate retrieval of at least one message from the first data partition in a FIFO manner utilizing the FIFO queue, such that the first message is retrieved before the second message.

19. The system of claim 17, the first data partition corresponding to a first virtual storage structure stored across a first physical storage device and a second physical storage device.

20. The system of claim 19, the storing component configured to:

store the first message within the first physical storage device; and store the second message within the second physical storage device.

* * * * *